(12) United States Patent
Cai et al.

(10) Patent No.: US 11,122,073 B1
(45) Date of Patent: Sep. 14, 2021

(54) SYSTEMS AND METHODS FOR CYBERSECURITY RISK MITIGATION AND MANAGEMENT

(71) Applicant: BitSight Technologies, Inc., Boston, MA (US)

(72) Inventors: Tianyi Cai, Brookline, MA (US); Thomas Erhardt Montroy, Cambridge, MA (US); Marc Noel Light, Somerville, MA (US)

(73) Assignee: BitSight Technologies, Inc., Boston, MA (US)

( * ) Notice: Subject to any disclaimer, the term of this patent is extended or adjusted under 35 U.S.C. 154(b) by 0 days.

(21) Appl. No.: 17/119,822

(22) Filed: Dec. 11, 2020

(51) Int. Cl.
  *H04L 29/06* (2006.01)
  *G06N 20/00* (2019.01)
(52) U.S. Cl.
  CPC ......... *H04L 63/1433* (2013.01); *G06N 20/00* (2019.01); *H04L 63/1425* (2013.01)
(58) Field of Classification Search
  CPC . H04L 63/1433; H04L 63/1425; G06N 20/00; G06F 21/50; G06Q 10/0635
  See application file for complete search history.

(56) References Cited

U.S. PATENT DOCUMENTS

| | | | | |
|---|---|---|---|---|
| 8,966,639 | B1* | 2/2015 | Roytman | H04L 63/1433 726/25 |
| 2005/0065807 | A1* | 3/2005 | DeAngelis | G06Q 10/10 705/7.28 |
| 2007/0136622 | A1* | 6/2007 | Price | G06Q 10/10 714/25 |
| 2010/0114634 | A1* | 5/2010 | Christiansen | G06Q 30/018 705/7.28 |
| 2013/0227697 | A1* | 8/2013 | Zandani | G06F 21/57 726/25 |
| 2014/0137257 | A1* | 5/2014 | Martinez | H04L 63/1433 726/25 |
| 2014/0337086 | A1* | 11/2014 | Asenjo | H04L 41/0896 705/7.28 |
| 2018/0146004 | A1* | 5/2018 | Belfiore, Jr. | G06F 21/577 |

OTHER PUBLICATIONS

Winship C, Mare RD. Models for sample selection bias. Annual review of sociology. Aug. 1992; 18(1):327-50. (Year: 1992).*

* cited by examiner

*Primary Examiner* — Robert B Leung
(74) *Attorney, Agent, or Firm* — Goodwin Procter LLP

(57) ABSTRACT

A cybersecurity risk management method may include recommending, for each of a plurality of affiliates of an entity, a respective cybersecurity criticality tier selected from a set of cybersecurity criticality tiers; receiving user input adjusting and/or adopting the recommended cybersecurity criticality tier for each of the affiliates; assigning each of the affiliates to the respective adjusted or adopted cybersecurity criticality tier; obtaining respective security scores for the affiliates; and displaying a user interface component configured to show a visualization of a cybersecurity risk management plan of the entity with respect to the plurality of affiliates, wherein the risk management plan partitions the affiliates into a plurality of affiliate sets based on the security scores and the assigned cybersecurity criticality tiers of the affiliates and specifies, for each of the affiliate sets, an action to be taken by the entity with respect to the affiliates in the affiliate set.

14 Claims, 8 Drawing Sheets

300

302 — Identify a group of peer entities (e.g., peer group) of the entity

304 — Determine a target distribution of affiliates in a representative sample of the entity's affiliates based on a distribution of affiliates in the peer entities' portfolios of monitored affiliates

SYSTEMS AND METHODS FOR CYBERSECURITY RISK MITIGATION AND MANAGEMENT

CROSS-REFERENCE TO RELATED APPLICATIONS

The subject matter of this application is related to the subject matter of U.S. patent application Ser. No. 16/802,232 titled "Systems and Methods for Improving a Security Profile of an Entity Based on Peer Security Profiles" and filed on Feb. 26, 2020 (now U.S. Pat. No. 10,764,298); U.S. patent application Ser. No. 13/240,572 titled "Information Technology Security Assessment System" and filed on Sep. 22, 2011 (now U.S. Pat. No. 10,805,331); U.S. patent application Ser. No. 15/142,677 titled "Security Assessment Using Service Provider Digital Asset Information" and filed on Apr. 29, 2016 (now U.S. Pat. No. 9,830,569); U.S. patent application Ser. No. 16/514,771 titled "Systems and Methods for Generating Security Improvement Plans for Entities" and filed on Jul. 17, 2019 (now U.S. Pat. No. 10,726,136); U.S. patent application Ser. No. 16/787,650 titled "Systems and Methods for Inferring Entity Relationships via Network Communications of Users or User Devices" and filed on Feb. 11, 2020; U.S. patent application Ser. No. 14/021,585 titled "Security Risk Management" and filed on Sep. 9, 2013 (now U.S. Pat. No. 9,438,615); and U.S. patent application Ser. No. 15/044,952 titled "Relationships Among Technology Assets and Services and the Entities Responsible for Them" and filed on Feb. 16, 2016, each of which is hereby incorporated by reference herein in its entirety.

TECHNICAL FIELD

The present disclosure relates generally to techniques for cybersecurity risk mitigation and/or management, and more particularly to methods and systems for customizing an entity's protocols for monitoring and managing cybersecurity risks to better assess and mitigate the specific cybersecurity risks to the entity posed by the entity's relationships with its affiliates.

BACKGROUND

Businesses, corporations, organizations, and other 'entities' often outsource tasks to third parties. As a result, such entities have relationships with (e.g., are 'related to' or 'connected to') numerous third party affiliates. These relationships can leave entities vulnerable to risks (e.g., threats) arising from the security practices of these third party affiliates.

SUMMARY

Reliably monitoring dozens, hundreds, or even thousands of third party affiliates can consume a large amount of an entity's time and other resources. For entities with a large quantity of third party affiliates, monitoring each and every affiliate can be prohibitively difficult or expensive. Thus, an entity may choose to monitor only a subset ("sample") of its full set of affiliates. However, an entity that monitors only a sample of its affiliates may fail to recognize and guard against risks arising from the security practices of the unmonitored affiliates, particularly if the selected sample is not representative of the full set of affiliates.

Thus, there exists a current need for a cybersecurity risk management technique for (1) identifying a subset of an entity's affiliates for cybersecurity monitoring, such that the cybersecurity risks posed by the entity's connections to the subset of affiliates are representative of the cybersecurity risks posed by the entity's connections to the full set of affiliates and (2) monitoring the subset of affiliates. In some embodiments, the subset of an entity's affiliates may be identified by (a) determining a target distribution (e.g., 'best practice distribution') of an entity's portfolio of monitored affiliates, (b) recommending changes to the entity's portfolio which, if adopted by the entity, would reduce the difference between the actual distribution of monitored affiliates within the entity's portfolio and the target distribution (e.g., would cause the actual distribution of the entity's monitored affiliates to substantially match the target distribution), and (c) upon receipt of the entity's authorization, making the authorized changes to the entity's portfolio.

In addition, an entity's relationships to different affiliates may pose different levels of risk to an entity. Thus, it is often appropriate for an entity to adopt different risk management protocols for different affiliates, depending on characteristics of the entity, characteristics of the affiliates, and/or other factors. However, determining the most suitable risk management protocol for a given affiliate can be difficult. When an entity chooses an unsuitable risk management protocol for a given affiliate, resources may be wasted (e.g., if the risks associated with the affiliate are small but the risk management protocol selected by the entity for the affiliate uses significant resources) or significant risks may be ignored (e.g., if the risks associated with the affiliate are great but the risk management protocol selected by the entity for the affiliate uses insufficient resources).

Thus, there exists a current need for techniques for determining the appropriate cybersecurity risk management protocol for an affiliate. The risk management protocol may specify, for example, (1) which of an entity's affiliates are to be monitored for cybersecurity risk, (2) what action(s) to take with respect to a monitored affiliate that poses a potential cybersecurity risk and (3) under what conditions those action(s) should be taken. In some cases, a machine-learned model may recommend a risk management protocol for an affiliate based, for example, on characteristics of the affiliate, characteristics of the entity, and/or risk management protocols adopted by other entities for the affiliate or similar affiliates.

In general, one innovative aspect of the subject matter described in the present disclosure can be embodied in a cybersecurity risk management method, including identifying a subset of a plurality of affiliates of an entity for cybersecurity monitoring, such that a collective cybersecurity threat posed by the subset of affiliates to the entity is indicative of a collective cybersecurity threat posed by the plurality of affiliates to the entity; and monitoring the subset of affiliates. The identifying may include determining a target distribution of affiliates within a representative sample of the plurality of affiliates; recommending one or more adjustments to a current sample of the affiliates of the entity, the adjustments being applicable to the current sample to reduce a difference between an actual distribution of affiliates within the current sample and the target distribution of affiliates within the representative sample, and upon receipt of user input indicating acceptance of at least one of the recommended adjustments, making the at least one accepted adjustment to the current sample of the affiliates, thereby generating an adjusted sample of the affiliates, wherein the adjusted sample of the affiliates is the subset of affiliates for cybersecurity monitoring.

Other embodiments of this aspect include corresponding systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, determining the target distribution of affiliates within the representative sample includes identifying a peer group of the entity. In some embodiments, the peer group of the entity is identified based on one or more characteristics of the entity. In some embodiments, the characteristics of the entity include a size of the entity, an industry in which the entity operates, and/or a sector in which the entity operates. In some embodiments, the target distribution of affiliates within the representative sample includes an aggregation of respective distributions of affiliates within samples of affiliates of a plurality of peer entities within the peer group. In some embodiments, the aggregation of respective distributions of affiliates includes an average of the respective distributions of affiliates.

In some embodiments, the affiliates within the representative sample are first affiliates, and the target distribution of the first affiliates indicates, for each of a plurality of affiliate classifications, a proportion of the first affiliates having the respective classification. In some embodiments, at least one of the affiliate classifications depends on a relationship of an affiliate to the entity.

In some embodiments, recommending the one or more adjustments to the current sample of the affiliates of the entity includes comparing the actual distribution of affiliates within the current sample and the target distribution of affiliates within the representative sample. In some embodiments, recommending the one or more adjustments to the current sample of the affiliates of the entity further includes generating a plurality of potential adjustments to the current sample of affiliates; and assigning respective scores to the potential adjustments, each of the scores being indicative of an expected impact of the corresponding potential adjustment on the difference between the actual distribution of affiliates and the target distribution of affiliates.

In some embodiments, the scores assigned to the potential adjustments are determined based, at least in part, on criticality tiers to which the affiliates in the plurality of affiliates are assigned. In some embodiments, the criticality tiers are assigned to the affiliates based, at least in part, on user input. In some embodiments, the criticality tiers are assigned to the affiliates based, at least in part, on tier recommendations provided by a machine-learned model. In some embodiments, the machine-learned model includes one or more classifiers, wherein each of the classifiers is associated with a respective group of entities, and wherein each of the classifiers is configured to assign candidate affiliates of entities in the respective group to corresponding criticality tiers based on one or more attributes of the candidate affiliates.

In some embodiments, recommending the one or more adjustments to the current sample of the affiliates of the entity further includes selecting one or more of the potential adjustments based on the scores; and presenting the selected potential adjustments via a user interface, wherein the selected potential adjustments are the one or more recommended adjustments.

In some embodiments, affiliate in the adjusted sample of affiliates is assigned (1) a respective security score indicating a level of cybersecurity risk associated with the affiliate and (2) a respective criticality tier indicating a level of criticality of a relationship between the affiliate and the entity. In some embodiments, the actions of the method further include displaying a user interface component configured to show a visualization of a cybersecurity risk mitigation plan of the entity with respect to the adjusted sample of affiliates, wherein the risk mitigation plan (1) partitions the adjusted sample of affiliates into a plurality of affiliate sets based on the security scores and the criticality tiers of the affiliates in the adjusted sample and (2) specifies, for each of the affiliate sets, an action to be taken by the entity with respect to the affiliates in the affiliate set.

In some embodiments, the visualization of the action plan includes a two-dimensional matrix, wherein a first dimension of the matrix corresponds to a range of security scores, and wherein a second dimension of the matrix corresponds to a set of criticality tiers. In some embodiments, the user interface component is interactive, and wherein the interactive user interface component is configured to receive user input specifying one or more security score thresholds used to partition the adjusted sample of affiliates into the plurality of affiliate sets. In some embodiments, the plurality of affiliate sets includes a particular affiliate set, and the action to be taken by the entity with respect to the affiliates in the particular set includes at least one act selected from a group of acts including monitoring the affiliates in the particular set, investigating the affiliates in the particular set, and contacting the affiliates in the particular set.

In general, another innovative aspect of the subject matter described in the present disclosure can be embodied in a cybersecurity risk management method, including recommending, for each of a plurality of affiliates of an entity, a respective cybersecurity criticality tier selected from a set of cybersecurity criticality tiers; receiving user input adjusting and/or adopting the recommended cybersecurity criticality tier for each of the affiliates; assigning each of the affiliates to the respective adjusted or adopted cybersecurity criticality tier; obtaining respective security scores for the affiliates; and displaying a user interface component configured to show a visualization of a cybersecurity risk management plan of the entity with respect to the plurality of affiliates, wherein the risk management plan (1) partitions the affiliates into a plurality of affiliate sets based on the security scores and the assigned cybersecurity criticality tiers of the affiliates and (2) specifies, for each of the affiliate sets, an action to be taken by the entity with respect to the affiliates in the affiliate set.

Other embodiments of this aspect include corresponding systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, the recommended cybersecurity criticality tier for a particular affiliate indicates a predicted level of criticality of a relationship between the particular affiliate and the entity. In some embodiments, the security score for a particular affiliate indicates a level of cybersecurity risk associated with the affiliate.

In some embodiments, the visualization of the action plan includes a two-dimensional matrix, wherein a first dimension of the matrix corresponds to a range of security scores, and wherein a second dimension of the matrix corresponds to a set of cybersecurity criticality tiers.

In some embodiments, the user interface component is interactive, and wherein the interactive user interface component is configured to receive user input specifying one or more security score thresholds used to partition the plurality of affiliates into the plurality of affiliate sets.

In some embodiments, the plurality of affiliate sets includes a particular affiliate set, and wherein the action to be taken by the entity with respect to the affiliates in the particular set includes at least one act selected from a group of acts including monitoring the affiliates in the particular set, investigating the affiliates in the particular set, and contacting the affiliates in the particular set.

In some embodiments, the user interface component is a first user interface component, and wherein recommending the respective cybersecurity criticality tiers for the plurality of affiliates of the entity includes identifying, using a machine-learned model, the recommended cybersecurity criticality tiers for the plurality affiliates; and presenting, via a second user interface component, the recommended cybersecurity criticality tiers for the plurality of affiliates. In some embodiments, the machine-learned model is selected based on a peer group of the entity. In some embodiments, the peer group of the entity is identified based on one or more characteristics of the entity. In some embodiments, the characteristics of the entity include a size of the entity, an industry in which the entity operates, and/or a sector in which the entity operates. In some embodiments, the machine-learned model identifies a particular recommended cybersecurity criticality tier for particular affiliate based on (1) one or more characteristics of the particular affiliate and (2) an analysis of a plurality of tier assignments made by a plurality of peer entities included in the peer group of the entity, wherein each of the tier assignments includes an assignment of an affiliate of at least one of the peer entities to a cybersecurity criticality tier. In some embodiments, the recommended tier for the particular affiliate is further identified based on one or more characteristics of the entity. In some embodiments, the particular recommended cybersecurity criticality tier for the particular affiliate is further identified based on a size of a subset of the plurality of affiliates of the entity, the subset of affiliates having been selected by the entity for cybersecurity monitoring.

In some embodiments, the machine-learned model includes a linear regression model. In some embodiments, identifying the recommended cybersecurity criticality tiers for the plurality affiliates includes generating, using the machine-learned model, respective cybersecurity criticality scores for the plurality of affiliates; normalizing the cybersecurity criticality scores, thereby generating normalized cybersecurity criticality scores within a bounded range; partitioning the normalized cybersecurity criticality scores into a number of partitions equal to a size of the set of cybersecurity criticality tiers, wherein each of the partitions corresponds to a respective one of the cybersecurity criticality tiers; and for each affiliate, selecting the cybersecurity criticality tier corresponding to the partition to which the normalized cybersecurity criticality score of the affiliate is assigned, and identifying the selected cybersecurity criticality tier as the recommended cybersecurity criticality tier for the affiliate.

The details of one or more embodiments of the subject matter described in this specification are set forth in the accompanying drawings and the description below. Other features, aspects, and advantages of the subject matter will become apparent from the description, the drawings, and the claims.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figures 1, 2:
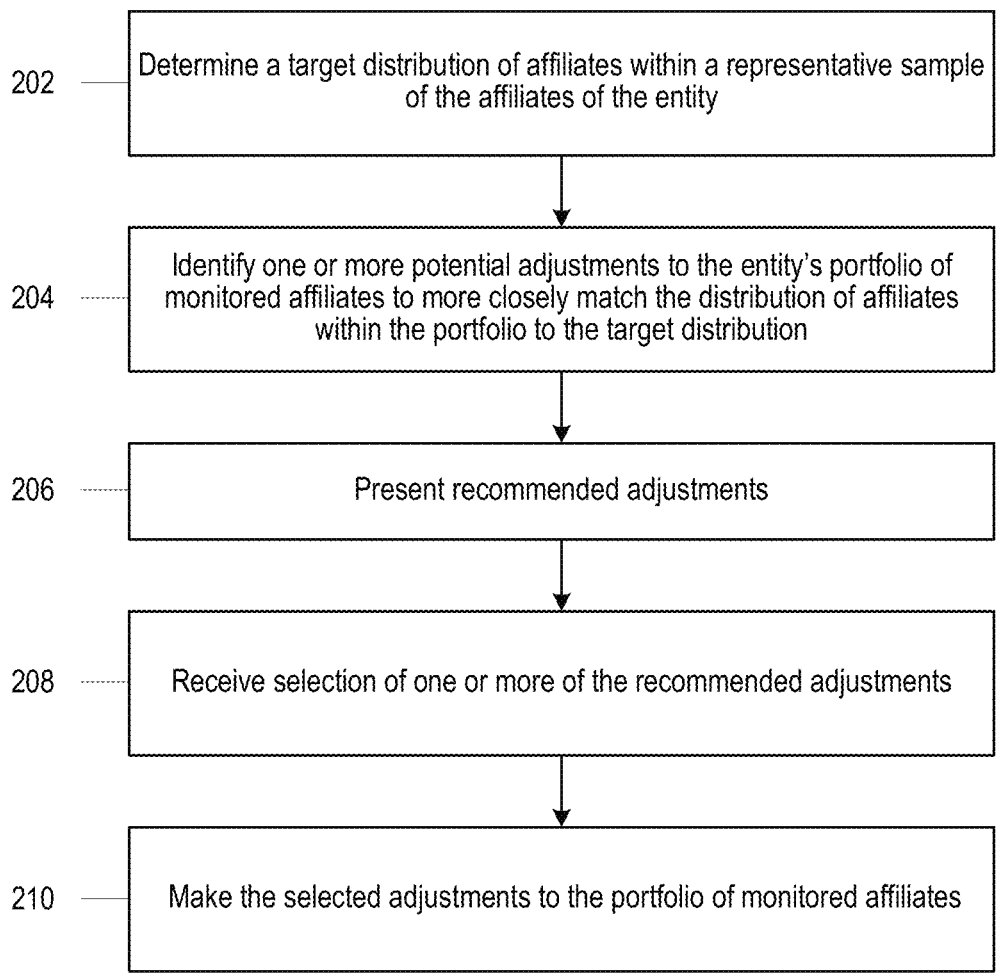
FIG. 1 depicts a flowchart of an entity-specific cybersecurity risk management method, according to some embodiments.
FIG. 2 depicts a flowchart of a method for identifying a subset of the affiliates of an entity for cybersecurity monitoring.

The present disclosure relates generally to techniques for cybersecurity risk management and/or mitigation, and more particularly to methods and systems for customizing an entity's protocols for monitoring and managing cybersecurity risks to better assess and mitigate the specific cybersecurity risks to the entity posed by the entity's relationships with its affiliates. Some embodiments described herein relate specifically to methods and systems for monitoring a subset of an entity's affiliates, such that the cybersecurity risks posed by the entity's relationships to the subset of affiliates are representative of the cybersecurity risks posed by the entity's relationships to the full set of affiliates. Some embodiments described herein relate specifically to methods and systems for visualizing and specifying an entity's action plans with respect to affiliates that pose a potential cybersecurity risk. Such action plans may be specified, for example, based on the affiliates' security ratings and on the criticality of the entity's relationships to the affiliates.

The methods and related systems disclosed herein provide for significant improvements in monitoring and mitigation of cybersecurity threats to an entity, and constitute specific implementations of solutions to problems that arise when attempting to monitor and mitigate the cybersecurity risks faced by an entity. Thus, the improved cybersecurity mitigation techniques described herein constitute improvements to computer-related technology for reasons similar to those articulated by the Federal Circuit in Finjan, Inc. v. Blue Coat Systems, Inc. (Fed. Cir. 2018), among other reasons, and are not abstract ideas.

As used herein, an "affiliate" of a particular entity may be any individual, organization, corporation and/or other entity that interacts with, provides services to, and/or otherwise has a relationship to or with the particular entity.

As used herein, the "criticality" of an entity's relationship to an affiliate may be a measurement or characterization of the extent to which the entity's well-being (e.g., operational integrity, health, reputation, financial position, security state, etc.) is sensitive to (e.g., dependent on) the affiliate's well-being.

An entity may monitor the security status (e.g., security ratings, security events, etc.) of one or more of the entity's affiliates. The monitored affiliates may be referred to herein as the entity's "portfolio" of affiliates. An entity's portfolio may include any number of the entity's affiliates (e.g., one or more, dozens, hundreds, thousands, etc.).

"Characteristics" of an entity (e.g., an affiliate or other entity) may include, without limitation, size (e.g., the number of employees or other members of the entity, the entity's market capitalization or annual revenues, etc.); the business sector (e.g., industry, sub-industry, etc.) in which the entity operates (e.g., legal services, technology, finance, etc.); age; rate of growth; North American Industry Classification System (NAICS) code; Standard Industrial Classification (SIC) code; a number of services provided by the entity; a security rating (e.g., as provided by BitSight Technologies, Inc. of Boston, Mass., USA); a geographical location of the entity; a location of the entity based on one or more IP addresses associated with the entity (e.g., "geo IP" footprint); a number of Internet Protocol (IP) addresses associated with the entity; the technology used by the entity (e.g., server software, user software, etc.); one or more security risk types of an entity; and/or known competitors or entities similar to the particular entity based on the web activity of the entity. Values for one or more of the above-listed entity characteristics may be provided by the entity itself, obtained from third party sources (e.g., a firmographics data source, data from BuiltWith® Pty Ltd), and/or collected or extracted from publicly available information. In some embodiments, the values for one or more entity characteristics can be stored in a database.

As used herein, the "distribution" of an entity's portfolio may refer to the distribution(s) of one or more characteristics of the affiliates in the entity's portfolio. For example, the "distribution" of an entity's portfolio may refer to the set of industries in which the portfolio of affiliates operate and the number (or proportion) of portfolio affiliates that operate in each of those industries.

As used herein, the "best practice distribution" or "best practice portfolio distribution" for an entity may refer to a portfolio distribution that is consistent with the monitoring practices of the entity's peer group. For example, the best practice portfolio distribution may be the average distribution of the portfolios of the entities in an entity's peer group. Some non-limiting examples of techniques for determining an entity's peer group are described in U.S. patent application Ser. No. 16/802,232.

A "security profile" of an entity may reflect the past, present, and/or future security characteristics of an entity. In some embodiments, the security profile may reflect security risks to which the entity is exposed balanced by the countermeasures that the entity has taken or can take to mitigate the security risk. As referred to herein, a security profile of an entity can include a "security rating" (e.g., "security score") for the entity. A security rating may be quantitative or qualitative. For example, a quantitative security rating may be expressed as a number within a predetermined range (e.g., between 300 and 900, as provided by BitSight Technologies, Inc. of Boston, Mass., USA). Some non-limiting examples of techniques for determining security ratings of entities are described in U.S. patent application Ser. Nos. 16/802,232, 13/240,572, 15/142,677, and 16/514,771.

As used herein, "monitoring" an affiliate may refer to determining (e.g., obtaining) a security rating of the affiliate from time to time, identifying one or more activities or events relevant to the affiliate's security profile, etc. Some non-limiting examples of techniques for determining security ratings of entities are described in U.S. patent application Ser. Nos. 16/802,232, 13/240,572, 15/142,677, and 16/514,771.

Some Embodiments of a Cybersecurity Risk Management Method

FIG. 1 depicts an entity-specific cybersecurity risk management method 100, according to some embodiments. In the example of FIG. 1, the risk management method 100 includes steps 102-104, which are described below. In some embodiments, the risk management method 100 is performed, for example, by a cybersecurity monitoring system of a risk management service provider (e.g., by an affiliate monitoring recommendation module of the risk monitoring system). Some non-limiting examples of cybersecurity monitoring systems are described in U.S. patent application Ser. Nos. 16/802,232, 13/240,572, 15/142,677, and 16/514,771.

In step 102 of the method 100, a subset S of the affiliates A of an entity E may be identified for cybersecurity monitoring. The subset S may be selected such that the collective cybersecurity threat posed to the entity by the affiliates in the subset is indicative of (e.g., representative of, substantially equal to, etc.) the collective cybersecurity threat posed by all the affiliates A. Some embodiments of techniques for selecting the subset S are described below, for example, with reference to FIGS. 2-4. In step 104, the affiliates in the subset S may be monitored.

FIG. 2 illustrates a method 200 for identifying a subset S of the affiliates A of an entity E for cybersecurity monitoring, according to some embodiments. In some embodiments, the method 200 is performed to accomplish step 102 of the method 100, or performing step 102 may involve performing the steps of method 200. In the example of FIG. 2, the method 200 includes steps 202-210, which are described below.

In step 202 of the method 200, a target distribution $D_T$ of affiliates within a representative sample SA of the affiliates of the entity E may be determined. This target distribution may be a best practice distribution for the entity's portfolio of monitored affiliates. Some embodiments of techniques for determining the target distribution $D_T$ (e.g., the best practice distribution for the entity's portfolio of monitored affiliates) are described below, for example, with reference to FIG. 3.

In step 204 of the method 200, one or more potential adjustments to entity E's portfolio of monitored affiliates are identified. Each of these potential adjustments, if applied to the entity's current portfolio, would cause the distribution of affiliates within the portfolio to more closely match the target distribution $D_T$. In other words, each of these potential adjustments, if applied to the entity's current portfolio, would reduce the difference between the distribution of affiliates within the portfolio and the target distribution $D_T$. Some non-limiting examples of potential adjustments to an entity's portfolio may include adding one or more affiliates to the portfolio, removing one or more affiliates from the portfolio, and/or replacing one or more affiliates currently in the portfolio with one or more affiliates not currently in the portfolio. Some embodiments of techniques for identifying potential adjustments to entity E's portfolio of monitored affiliates are described below, for example, with reference to FIG. 4.

Referring again to FIG. 2, in step 206 of the method 200, one or more of the potential adjustments to entity E's portfolio of monitored affiliates are recommended. Recommending a potential adjustment to an entity E's portfolio may involve presenting the potential adjustment to a user of a cybersecurity monitoring system of a risk management service provider. Potential adjustments to an entity's portfolio may be presented, for example, via a user interface of a cybersecurity monitoring system, which may be displayed on a computer system accessible to the user.

In some embodiments, recommending a potential adjustment to an entity E's portfolio involves presenting a score associated with the potential adjustment (e.g., an "adjustment score") to the user. A potential adjustment's score may indicate the expected impact of the adjustment on the difference between the actual distribution of affiliates in the entity's portfolio and the target distribution of affiliates. For example, a potential adjustment's score may indicate a percentage by which the difference between the distribution of affiliates within the portfolio and the target distribution $D_T$ would be reduced if the potential adjustment were applied to the entity's portfolio. Other techniques for scoring potential adjustments are possible. Some embodiments of techniques for determining scores corresponding to potential adjustments to an entity's portfolio are described below, for example, with reference to FIG. 4. In some embodiments, when one or more potential adjustments to an entity E's portfolio are recommended, the system may present the potential adjustments in order according to the scores associated with each potential adjustment.

Referring again to FIG. 2, in step 208 of the method 200, user input indicating selection of one or more of the recommended adjustments is received. The user input may be provided, for example, via a user interface of a cybersecurity monitoring system, which may be displayed on a computer system accessible to the user. In some cases, the selected adjustments may be selected by the user based on the corresponding adjustment scores.

In step 210 of the method 200, the selected adjustments may be applied to the entity's portfolio of monitored affiliates. Applying the selected adjustments may involve updating a set of records representing the entity's portfolio within the cybersecurity monitoring system, for example, by adding records of one or more affiliates to the set, removing records of one or more affiliates from the set, and/or replacing records of one or more affiliates currently in the set with one or more affiliates not currently in the set. Alternatively, in some embodiments, applying the selected adjustments may involve storing records of the selected adjustments in a datastore for subsequent application to the entity's portfolio.

An example has been described in which a cybersecurity system presents potential adjustments to an entity's portfolio of monitored affiliates via a user interface, receives user input indicating selection of one or more of the recommended adjustments via the user interface, and applies the selected adjustments to the entity's portfolio. Alternatively, in some embodiments, the system automatically selects one or more of the potential adjustments (e.g., based on the corresponding adjustment scores) and applies the selected adjustments to the entity's portfolio, with or without presenting the recommended (or selected) adjustments to a user, and with or without receiving user input indicating approval of the selected adjustments. Automatic selection and/or application of adjustments to an entity's portfolio may be performed, for example, when the entity has authorized an operator of a cybersecurity monitoring system (e.g., a risk management service provider) to automatically determine the composition of the entity's portfolio of monitored affiliates on the entity's behalf.

Figure 3:
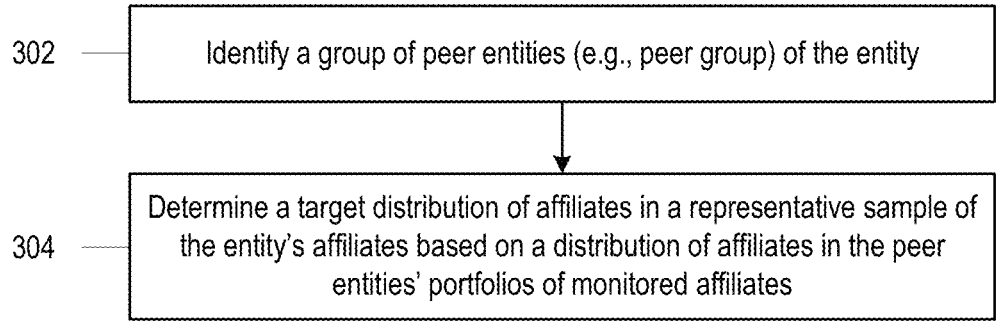
FIG. 3 depicts a flowchart of a method for determining a target distribution of affiliates within a representative sample of an entity's affiliates, according to some embodiments.

FIG. 3 depicts a method 300 for determining a target distribution $D_T$ of affiliates within a representative sample SA of the affiliates of an entity E, according to some embodiments. This target distribution may be a best practice distribution for the entity's portfolio of monitored affiliates. In some embodiments, the method 300 is performed to accomplish step 202 of the method 200, or performing step 202 may involve performing the steps of method 300. In the example of FIG. 3, the method 300 includes steps 302-304, which are described below.

In step 302 of the method 300, a peer group of the entity E is identified. In some embodiments, the entity's peer group is identified based on one or more characteristics of the entity E. Some non-limiting examples of entity characteristics are described above. In some embodiments, an entity's peer group is identified based on the size of the entity and/or the industry in which the entity operates. Some non-limiting examples of techniques for identifying an entity's peer group are described in U.S. patent application Ser. No. 16/802,232.

When an entity's peer group is identified based on the entity's size, rules or heuristics related to the sizes of entities may be used to enhance the level of similarity between the entity E and the entities in E's peer group. For example, assuming the entity's 'size' is represented by a positive integer (e.g., the number of the entity's employees), entities may be partitioned into peer groups based on size thresholds. For example, the system may partition entities into four peer groups of sizes 1-999, 1,000-4,999, 5,000-19,999, and 20,000 or more. Any suitable number of peer groups may be used, and any suitable size thresholds may be used to partition the peer groups. Likewise, when an entity's size is one of a plurality of factors used to identify the entity's peer group, the system may partition the entities into any suitable number of sets (e.g., four sets), and all of the entities in an entity E's peer group may be selected from the same set as the entity E.

In some cases, the above-describe partitioning scheme have the unintended effect of placing entities of relatively similar sizes in different peer groups. For example, using the specific partitioning scheme described above, an entity E1 with a size of 4,900 and an entity E2 with a size of 5,100 would be placed into different peer groups, even though E1 and E2 have similar sizes.

In some embodiments, an alternative set of rules or heuristics may be used to identify an entity's peer group (or a subset of candidate entities that can be further filtered to identify the entity's peer group). For example, an entity's peer group may be identified using the following rules:

If the entity E's size is less than first threshold (e.g., 1,000), the entity's peer group may include other entities with sizes ranging from 1 to (i) the first threshold or (ii) a first multiple (e.g., two) of the size of entity E, whichever is larger.

If the entity E's size is greater than or equal to the first threshold and less than a second threshold (e.g., 5,000), the entity's peer group may include other entities with sizes ranging from a first fraction (e.g., one-fifth) of the size of entity E to a second multiple (e.g., five) of the size of entity E.

If the entity E's size is greater than or equal to the second threshold and less than a third threshold (e.g., 20,000), the entity's peer group may include other entities with sizes ranging from a second fraction (e.g., one-fifth) of the size of entity E to a third multiple (e.g., 10) of the size of entity E.

If the entity E's size is greater than or equal to the third threshold, the entity's peer group may include other entities with sizes greater than or equal to the size of the entity E.

The foregoing example is not limiting. Peer groups may be determined using any suitable number of thresholds (e.g., 1-20 or more) having any suitable values (e.g., 1-100,000 or more). Likewise, the fractional values and multipliers used to define the scope of an entity's peer group may have any suitable values. For example, the fractional values may range from 0.99 to 0.01 or smaller, and the multipliers may range from 1.01 to 100 or greater.

As one of ordinary skill in the art will appreciate, the second above-described scheme for identifying an entity's peer group may outperform the first above-described scheme, in the sense that the entities in the peer groups identified using the second scheme may tend to be more similar to each other than the entities in the peer groups identified using the first scheme.

In some embodiments, characteristics other than size are used to identify an entity's peer group. For example, a first subset of candidate entities may be selected based on size, and the peer group may then be identified based on other characteristics of the candidate entities. Alternatively, size and one or more other characteristics may be considered collectively to determine an entity's peer group, rather than using size as a primary filter and then using the other characteristics as secondary filters. In some embodiments, any suitable characteristic may be used as the primary filter.

Still referring to FIG. 3, in step 304 of the method 300, a target distribution $D_T$ of affiliates in a representative sample of an entity E's affiliates may be determined. As discussed above, the "distribution" of an entity's portfolio may refer to the distribution(s) of one or more characteristics of the affiliates in the entity's portfolio. For example, the "distribution" of an entity's portfolio may refer to the set of industries in which the portfolio of affiliates operate and the number (or proportion) of portfolio affiliates that operate in each of those industries.

In some embodiments, the target distribution $D_T$ is the best practice distribution for the entity's portfolio of monitored affiliates. The best practice distribution for the entity E's portfolio may be determined based on the distributions of affiliates in the portfolios of entity E's peers (the entities in entity E's peer group). For example, the best practice distribution for the entity E's portfolio may be determined by aggregating (e.g., averaging) the actual portfolio distributions of the entities within the peer group. As another example, a posterior estimate of the best practice distribution for entity E's portfolio may be determined by calculating a Dirichlet-Multinomial conjugate prior of the peer entities' portfolios, which can generally be calculated very quickly and efficiently. The Dirichlet distribution may assign a proportion to each industry in which the affiliates of entity E's peers operate and ensure that the sum of these proportions is equal to 1.

Figure 4:
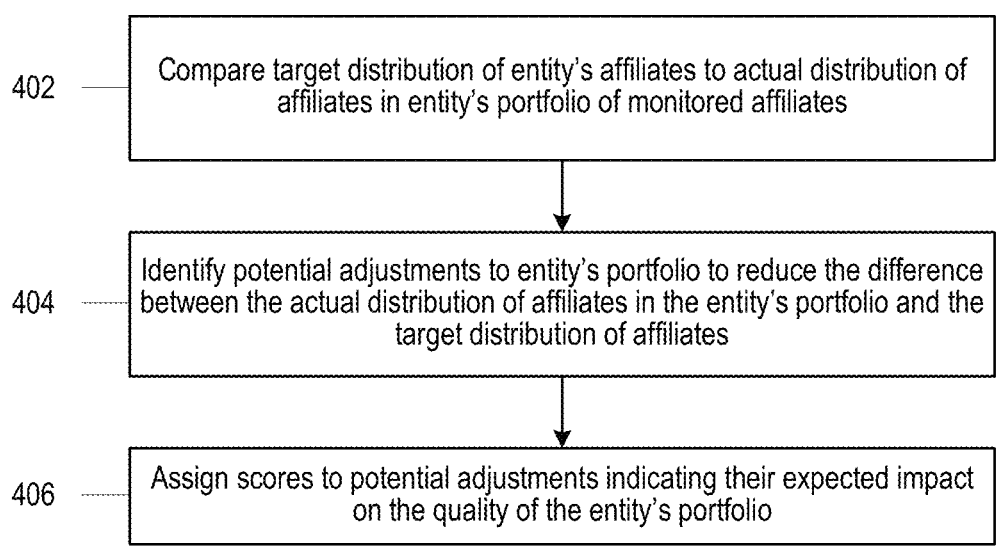
FIG. 4 depicts a flowchart of a method for providing recommended adjustments to an entity's portfolio of monitored affiliates, according to some embodiments.

FIG. 4 depicts a method 400 for providing recommended adjustments to an entity E's portfolio of monitored affiliates, according to some embodiments. In some embodiments, the method 400 is performed to accomplish step 204 of the method 200, or performing step 204 may involve performing the steps of method 400. In the example of FIG. 4, the recommendation method 400 includes steps 402-406, which are described below.

In step 402, the target distribution (e.g., best practice distribution) of the entity's portfolio is compared to the actual distribution of the entity's portfolio of monitored affiliates, according to some embodiments. Comparing the best practice portfolio distribution to the actual portfolio distribution may reveal areas in which the actual portfolio distribution differs from the best practice portfolio distribution. For example, the comparison may reveal that the proportion of affiliates in entity E's portfolio within a particular industry I1 is greater than the proportion of affiliates within industry I1 in the best practice portfolio distribution, and/or that the proportion of affiliates in entity E's portfolio within another industry I2 is less than the proportion of affiliates within industry I2 in the best practice portfolio distribution.

In step 404, the system may identify potential adjustments to the entity's portfolio that would result in an actual portfolio distribution more closely aligned with the best practice portfolio distribution. In some embodiments, potential adjustments may include adding one or more affiliates to and/or removing one or more affiliates from the entity's portfolio. Any suitable technique may be used to identify potential adjustments to the entity's portfolio. In some embodiments, for any industry in which the proportion of affiliates in E's portfolio is greater than the corresponding proportion of affiliates in the best practice portfolio, the system may identify the removal of one or more of the monitored affiliates in that industry from E's portfolio as a potential adjustment. Likewise, for any industry in which the proportion of affiliates in E's portfolio is less than the corresponding proportion of affiliates in the best practice portfolio, the system may identify addition of one or more of the non-monitored affiliates in that industry to E's portfolio as a potential adjustment.

In step 406, the system may assign scores to the identified potential adjustments. The score assigned to a potential adjustment may indicate the expected impact of that adjustment on the quality of the entity's portfolio (e.g., the extent to which the potential adjustment is expected to decrease the difference(s) between the actual distribution of E's portfolio and the target distribution of E's portfolio). In some embodiments, the scores assigned to the potential adjustments may be determined based, at least in part, on criticality tiers to which entity E's affiliates are assigned. Some non-limiting examples of techniques for assigning criticality tiers to an entity's affiliates are described below.

Some Embodiments of Another Cybersecurity Risk Management Method

An entity's relationships to different affiliates may pose different levels of risk to the entity. Thus, it is often appropriate for an entity to adopt different risk management protocols for different affiliates, depending on characteristics of the entity, characteristics of the affiliates, the nature of the entity's relationship to the entity, and/or other factors. However, determining the most suitable risk management protocol for a given affiliate can be difficult. When an entity chooses an unsuitable risk management protocol for a given affiliate, resources may be wasted or significant risks may be ignored.

Figure 5:
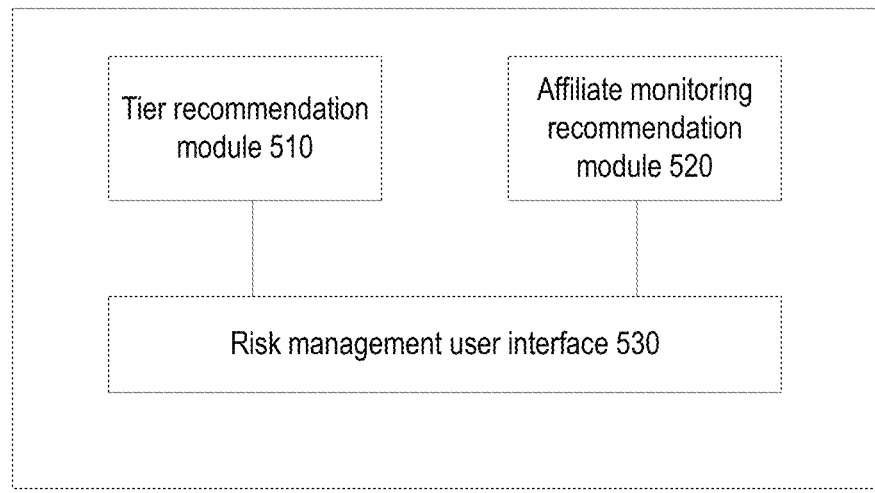
FIG. 5 is a block diagram of a risk management tool, according to some embodiments.

Thus, a tool for determining the appropriate cybersecurity risk management protocols for an entity's various affiliates is needed. Referring to FIG. 5, an example of a risk management tool 500 is shown. In some embodiments, the risk management tool 500 may recommend risk management protocols for various affiliates based, for example, on characteristics of the affiliate, characteristics of the entity, the nature of the entity's relationships to the affiliates, risk management protocols adopted by other entities for the same affiliates or similar affiliates, and/or other factors. The risk management protocols may specify, for example, (1) which of an entity's affiliates are to be monitored for cybersecurity risk, (2) what action(s) are to be taken with respect to a monitored affiliate that poses a potential cybersecurity risk, and/or (3) under what conditions those action(s) are to be taken.

Some embodiments of a risk management tool 500 are described below. In some embodiments, the risk management tool may include a tier recommendation module 510, which may recommend assignment of an entity's affiliates (e.g., monitored affiliates, unmonitored affiliates, or monitored and unmonitored affiliates) to various "criticality tiers." The criticality tier to which an affiliate is assigned may indicate a level of criticality of the entity's relationship to the affiliate. For example, the criticality tier to which an entity assigns an affiliate may indicate the extent to which the entity's well-being (e.g., operational integrity, health, reputation, financial position, security state, etc.) is sensitive to (e.g., dependent on) the affiliate's well-being. In some embodiments, the tier recommendation module 510 may determine the recommended criticality tiers for an entity's affiliates by performing a risk management method 700 as described below with reference to FIG. 7.

In some embodiments, the risk management tool 500 may include an affiliate monitoring recommendation module 520, which may identify a subset of an entity's affiliates and recommend that the security state of the subset of affiliates be monitored. In some embodiments, the affiliate monitoring recommendation module 520 may identify the affiliates to be monitored by performing a risk management method 100 as described above with reference to FIGS. 1-4. Other techniques for identifying the affiliates to be monitored may be used.

In some embodiments, the risk management tool 500 may be implemented as software executed on one or more computer systems 800. In some embodiments, the risk management tool may provide a user interface 530, which may include user interface (UI) components (610, 630, 650, 670) as described below with reference to FIGS. 6A-6D. The user interface 530 may present (e.g., display) information regarding the security states of an entity's affiliates (e.g., the cybersecurity risks posed by the entity's affiliates) and/or the entity's risk mitigation plans with respect to various affiliates.

In some embodiments, the user interface 530 may provide interactive components whereby a user may interact with the tier recommendation module 510. For example, by interacting with a user interface 530, the user may query the tier recommendation module 510 regarding the recommended criticality tier(s) for one or more of the entity's affiliates. In response to such a query, the tier recommendation module 510 may obtain the recommended criticality tier(s) for the specified affiliates (e.g., by performing the risk management method 700, or by retrieving previously-determined criticality tier recommendations from a storage device) and provide those recommendations to the user via the user interface 530.

In some embodiments, the user interface 530 may provide interactive components whereby a user may interact with the affiliate monitoring recommendation module 520. For example, by interacting with a user interface 530, the user may query the affiliate monitoring recommendation module 520 regarding the affiliates for which security monitoring is recommended. In response to such a query, the affiliated monitoring recommendation module 520 may determine the affiliates for which security monitoring is recommended (e.g., by performing the risk management method 100, or by retrieving previously-determined affiliate monitoring recommendations from a storage device) and provide those recommendations to the user via the user interface 530.

Some embodiments and/or applications of the tier recommendation module 510, the affiliate monitoring recommendation module 520, and user interface 530 are described in further detail below. In addition, some embodiments of a risk management method 700 are described below.

The tier recommendation module 510 may recommend assignment of one or more (e.g., all) of an entity's affiliates to various "criticality tiers." In some embodiments, by default, the risk management tool 500 may automatically assign the recommended criticality tiers to an entity's affiliates. In some embodiments, the risk management tool 500 may provide tiering recommendations to a user (e.g., via the user interface 530), who may then adopt one or more of the recommendations (e.g., by providing user input indicating acceptance of said recommendations) and/or adjust one or more of the recommendations (e.g., by providing user input overriding the recommended criticality tiers for one or more of the entity's affiliates). In some embodiments, the tier recommendation tool 510 may provide the tiering recommendations for an entity's affiliates during an onboarding process for an entity that is establishing or updating risk management protocols with respect to its affiliates.

The risk management tool 500 may support assignment of an entity's affiliates to any suitable number of criticality tiers (e.g., 2-10 tiers, 2 tiers, 3 tiers, 5 tiers, etc.). The tiers may have any suitable labels, and the criticality levels corresponding to the tiers may have any suitable relationship to the tier labels. For example, the risk management tool 500 may support 3 criticality tiers, which may be referred to as Tier 1, Tier 2, and Tier 3, with Tier 1 affiliates being most critical to an entity's well-being, Tier 2 affiliates being moderately critical to an entity's well-being, and Tier 3 affiliates being least critical to an entity's well-being. Unless otherwise noted, the examples described herein are based on the foregoing configuration of tiers. However, alternative tiering configurations are possible.

In some embodiments, tier recommendation module 510 (or "tier recommender" 510) uses one or more models (e.g., mathematical, statistical, and/or machine-learned models) to generate affiliate tiering recommendations for entities. For example, the tier recommender 510 may use a single model to generate affiliate tiering recommendations for all entities. Alternatively, the tier recommender 510 may use different models to generate affiliate tiering recommendations for different sets of entities (e.g., entity peer groups or other sets of entities). Each model M that is configured for use by a set of entities {E} (e.g., all entities, a peer group of entities, etc.) may be adapted to identify a recommended criticality tier T(E, A) for each affiliate A in a set of affiliates {A} (e.g., all affiliates, all monitored affiliates, one or more specified affiliates, etc.) of any entity E in the set of entities {E}.

A model M may use any suitable data and/or criteria to determine the recommended tier assignment for an affiliate A of an entity E. Some non-limiting examples of suitable data and/or criteria include characteristics of the affiliate A (e.g., the affiliate's size, industry, sector, etc.), characteristics of the entity E (e.g., the number or proportion of the entity's affiliates monitored by the entity, etc.), the relationship between the entity E and the affiliate A, the tier to which other entities (e.g., entities in the same peer group as entity E) have assigned the affiliate A or affiliates having characteristics similar to the characteristics of affiliate A, etc.

Any suitable machine learning techniques may be used to train any suitable type of model M to determine the recommended tier assignment for an affiliate of an entity. Some non-limiting examples of types of machine-learned models and techniques for training such models are described below in the section titled "Machine Learning Techniques and Machine-Learned Models." In some embodiments, the training data used to train a model M to infer the recommended tier assignment for an affiliate of an entity may include a set of labeled records. Each of the labeled records may represent a tier assignment T for an affiliate A of an entity E (e.g., an entity E in the set of entities {E} corresponding to the model).

Each of the tier assignment records may include a value of a label and values of a set of features. The value of a record's label may indicate a tier to T which the affiliate A of the entity E is assigned. For example, the value of the record's label may include a unique identifier of the tier T or a criticality score CS that can processed to determine the tier T. The values of a record's set of features may include any suitable data from which the value of the record's label may be inferred. For example, the values of a record's set of features may indicate one or more characteristics of the affiliate A, one or more characteristics of the entity E, and/or any other suitable information.

In some embodiments, the labeled records of the training data for the model M may be generated by selecting a sample of actual tier assignments {T} used by entities in the set of entities {E} for their affiliates, extracting feature values corresponding to the entities and affiliates from available entity data and affiliate data, and mapping the tier assignments and feature values to a set of records. Some non-limiting examples of specific labels and features that may be included in the records of the training data used to train a model M to infer the recommended tier assignments T for affiliates A of an entity E in a set of entities {E} (e.g., a peer group of entities) are described below.

In some embodiments, for a record R representing a tier assignment T for an affiliate A of an entity E in a set of entities {E}, the value of the record's label may be a unique identifier of the tier T or a criticality score CS that can be processed to determine the tier T. For example, a criticality score CS may be a normalized value within a bounded range (e.g., $[0, 1]$). The criticality score may indicate the criticality of the affiliate A to a particular entity E, to a particular subset of the entities {E}, or to the set of entities {E}.

The use of "criticality scores" rather than tier identifiers as labels in the model's training data may enhance the flexibility and reusability of the model M. Different entities may assign their affiliates to different numbers of criticality tiers, and even entities that assign their affiliates to the same number of criticality tiers may use different criteria to partition their affiliates among those tiers. However, the "criticality score" may be a standardized metric suitable for use by all entities, irrespective of the number of criticality tiers and the tier partitioning criteria used by those entities. Thus, a model M capable of inferring a suitable criticality score CS for an affiliate A of an entity E in a set of entities {E} may be productively used by any entity in the set, irrespective of the number of criticality tiers and/or the tier partitioning criteria used by the entity.

In some embodiments, a record R may represent an individual tier assignment T for an affiliate A of an entity E, an aggregation of multiple (two or more) tier assignments for multiple affiliates by a single entity E ("aggregation type 1"), an aggregation of multiple tier assignments for a single affiliate A by multiple entities ("aggregation type 2"), or an aggregation of multiple tier assignments for multiple affiliates by multiple entities ("aggregation type 3"). The use of records representing aggregated tier assignments may facilitate the training of a model M in cases where the available training data indicate that different tiers (or tiers that map to different criticality scores CS) have been assigned to affiliate-entity pairs that have identical or similar characteristics.

For example, an entity E1 may have three affiliates (A1, A2, A3) with identical or similar characteristics, and E1 may have identical or similar relationships with all three affiliates. Nevertheless, for reasons that are not readily apparent, E1 may have assigned A1 and A2 to a tier T1 (corresponding to a criticality score CS1), but assign A3 to a different tier T2 (corresponding to a different criticality score CS2). In such a case, using individual records of these three tier assignments to train the model M may have a negative impact on the performance (e.g., accuracy) of the model. Alternatively, a "type 1" aggregated record of the related tier assignments may be generated and used to train the model. The label of the aggregated record may be derived from the labels of the individual, related records using any suitable aggregation technique. For example, the aggregated label may be the mean or median of the labels of the individual, related records. If the values of the corresponding features of the individual, related records are not identical, those values may also be aggregated to determine the value of the corresponding feature in the aggregated record.

Likewise, if different entities with identical or similar characteristics have the same affiliate, a "type 2" aggregated record of the entities' tier assignments for that affiliate may be generated and used to train the model. The values of the label and features of the type 2 aggregated record may be generated from the individual, related records using the above-described techniques.

Likewise, if different entities with identical or similar characteristics have similar affiliates, a "type 3" aggregated record of the entities' tier assignments for those affiliates may be generated and used to train the model. The values of the label and features of the type 3 aggregated record may be generated from the individual, related records using the above-described techniques.

In some embodiments, for a record R representing a tier assignment T for an affiliate A of an entity E in a set of entities {E}, the record's features may include one or more characteristics of the affiliate A and/or one or more features derived, at least in part, from one or more characteristics of the affiliate A. Such characteristics of an affiliate may include, without limitation, an affiliate's size, industry, and/or sector.

For example, a record's features may include a derived feature referred to herein as affiliate_sis_factor. The value of the affiliate_sis_factor feature for a given affiliate A may be determined based on the size, industry, and sector of the affiliate A. More specifically, the size, industry, and/or sector of the affiliate A may be used to assign the affiliate A to a set of similar affiliates, and all the affiliates in the set may share a common value for the affiliate_sis_factor feature, which may indicate a representative tier (or criticality score) for the affiliates in the set. Some non-limiting examples of affiliate sets may include (1) affiliates that operate in the same industry and have sizes in the same size range, (2) affiliates that operate in the same sector and have sizes in the same size range, (3) affiliates that operate in the same industry, or (4) affiliates that operate in the same sector. Some non-limiting examples of size ranges may include (1) size<a first threshold Th1, (2) Th1≤size<a second threshold Th2, or (3) size≥Th2. In some embodiments, the tier recommendation module 510 may use a particular affiliate set only if the number of affiliates assigned to affiliate set exceeds a minimum size (e.g., 20 affiliates, 50 affiliates, 100 affiliates, or any other suitable size).

The value of the affiliate_sis_factor feature for the affiliates in an affiliate set {A} may be determined using the following expression:

affiliate_sis_factor{$A$}=average{$T(A)$}/dispersion{$T(A)$}, where {T(A)} refers to the set of tier labels assigned to the set of affiliates {A} in the selected sample of actual tier assignments, average {T(A)} refers to the average (e.g., mean, median, or mode) of the values in the set of tier labels {T(A)}, and dispersion refers to a measure of the dispersion of the values in the set of tier labels {T(A)} (e.g., the standard deviation of those values). Each of the tier labels T(A) may be, for example, a unique tier index (e.g., an integer corresponding to the tier) or a criticality score corresponding to the tier to which the affiliate A is assigned in the selected sample of actual tier assignments.

As another example, a record's features may include a derived feature referred to herein as affiliate_id_factor. The value of the affiliate_id_factor feature for a given affiliate A may be determined based on the tier(s) to which the affiliate A has been assigned by multiple entities. More specifically, the value of the affiliate_id_factor feature for an affiliate A may be determined using the following expression:

affiliate_id_factor{$A$}=average{$T(A)$}/dispersion{$T(A)$}, where {T(A)} refers to the set of tier labels assigned to the affiliates A in the selected sample of actual tier assignments, average {T(A)} refers to the average (e.g., mean, median, or mode) of the values in the set of tier labels {T(A)}, and dispersion refers to a measure of the dispersion of the values in the set of tier labels {T(A)} (e.g., the standard deviation of those values). Each of the tier labels T(A) may be, for example, a unique tier index (e.g., an integer corresponding to the tier) or a criticality score corresponding to the tier to which the affiliate A is assigned in the selected sample of actual tier assignments.

In some embodiments, the tier recommendation module 510 may use the affiliate_id_factor feature (e.g., assign a non-zero or non-null value to the affiliate_id_factor feature) for an affiliate A only if the number of tier assignment records for the entity A (in the selected sample of actual tier assignments) exceeds a minimum number (e.g., 3 assignments, 5 assignments, 10 assignments, or any other suitable number of tier assignments).

In some embodiments, for a record R representing a tier assignment T for an affiliate A of an entity E in a set of entities {E}, the record's features may include one or more characteristics of the entity E and/or one or more features derived, at least in part, from one or more characteristics of the entity E. Such entity characteristics, without limitation, the number of affiliates monitored by the entity (the size of the entity's affiliate portfolio).

For example, a record's features may include a derived feature referred to herein as portfolio_size. The value of the portfolio_size feature for an entity may be determined based on the size of the entity's affiliate portfolio. For example, the value of the portfolio_size feature may be determined using the following expression:

portfolio_size=$F(\max(\text{num}(A,E),N)$, where num(A, E) is the number of affiliates monitored by entity E, N is a threshold value (e.g., 100, 200, or 500), max(x, y) is the greater of the values x and y, and F is any suitable function (e.g., a logarithm).

The tier recommender 510 may use any suitable type of model to infer recommended tiers for affiliates of various entities. In some embodiments, the model M may be a regression model (e.g., a linear regression model). For example, the model M may be a linear regression model of the following form:

tier_rec=$a$*portfolio_size+$b$*affiliate_id_factor+$c$*affiliate_sis_factor, where tier_rec is the recommended tier (or recommended criticality score) for an affiliate A of an entity E; the portfolio_size, affiliate_id_factor, and affiliate_sis_factors are derived from the characteristics of the affiliate A and the entity E as described above, and the values of the coefficients a, b, and c are machine learned.

As mentioned above, criticality scores (e.g., tier_rec) may be mapped to any suitable number of tiers using any suitable mapping functions. For example, criticality scores CS may be normalized values within a bounded range [0, range_max]. In some embodiments, such criticality scores CS are mapped to tiers by (1) converting the normalized value of the criticality score CS into a percentile (e.g., CS_percentile=CS/range_max), and (2) mapping specified ranges of percentiles to the available number of tiers.

For example, if an entity uses a three-tiered scheme, the entity may map criticality scores to the three tiers as follows:
Tier 1: CS_percentile<33;
Tier 2: 33≤CS_percentile<66;
Tier 3: CS_percentile≥66.

Likewise, if an entity uses a four-tiered scheme, the entity may map criticality scores to the four tiers as follows:
Tier 1: CS_percentile<25;
Tier 2: 25≤CS_percentile<50;
Tier 3: 50≤CS_percentile<75;

Tier 4: CS_percentile≥75.

In the foregoing examples, the percentile range is divided into Z equally-sized sub-ranges, where Z is the number of available tiers, and each sub-range of percentiles is assigned to a corresponding tier. Other mapping schema are possible.

As previously mentioned, the risk management tool may provide a user interface 530, which may present information regarding the security states of an entity's affiliates and/or the entity's risk mitigation plans with respect to various affiliates. In some embodiments, the user interface 530 may provide interactive components whereby a user may interact with the tier recommendation module 510 and/or the affiliate monitoring recommendation module 520.

Figure 6A:
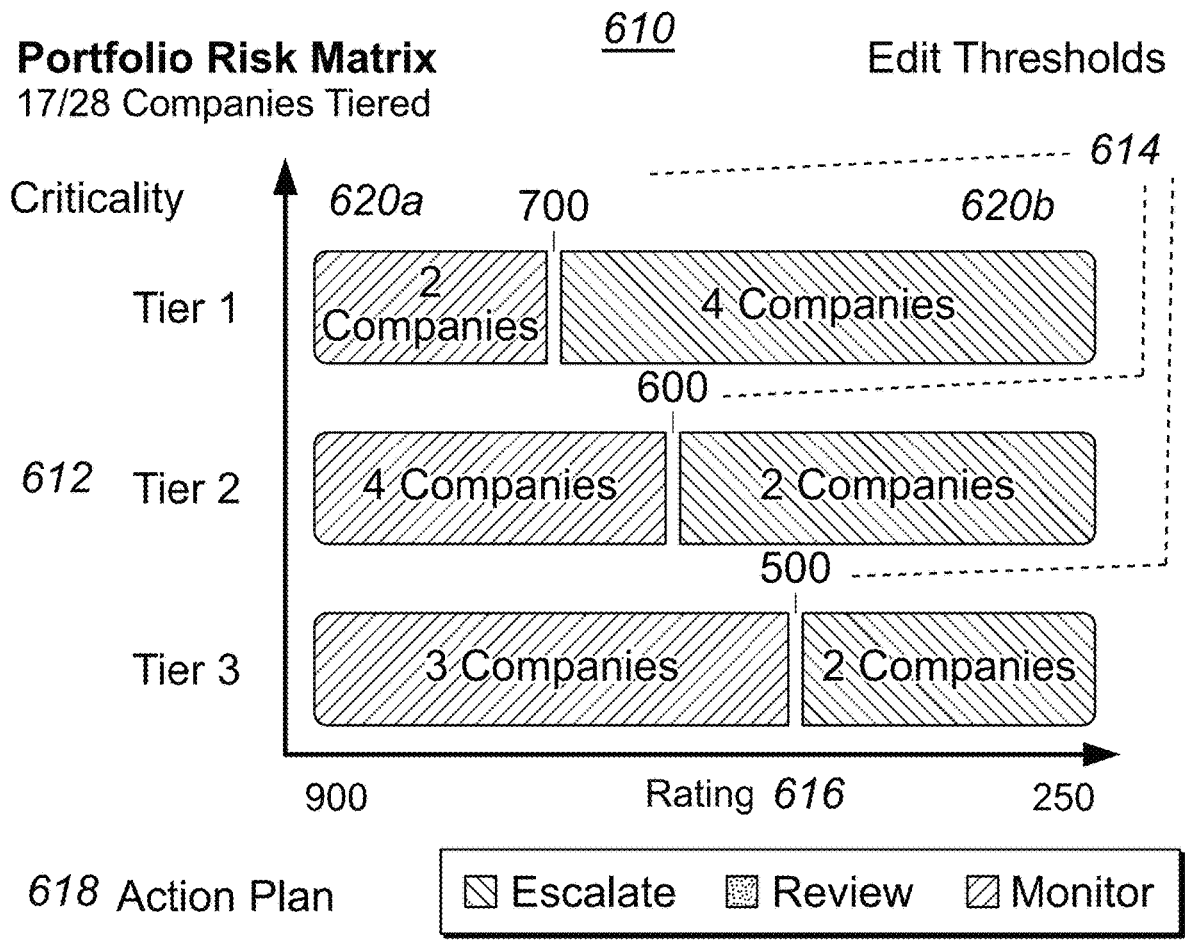
FIG. 6A depicts an example of a user interface for cybersecurity risk management, according to some embodiments.
Figure 6C:
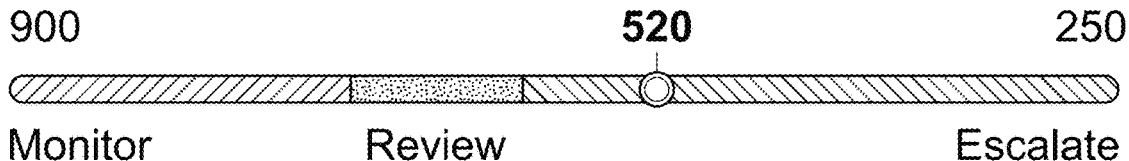
FIG. 6C depicts an example of a user interface for specifying a cybersecurity risk mitigation plan, according to some embodiments.
Figure 6B:
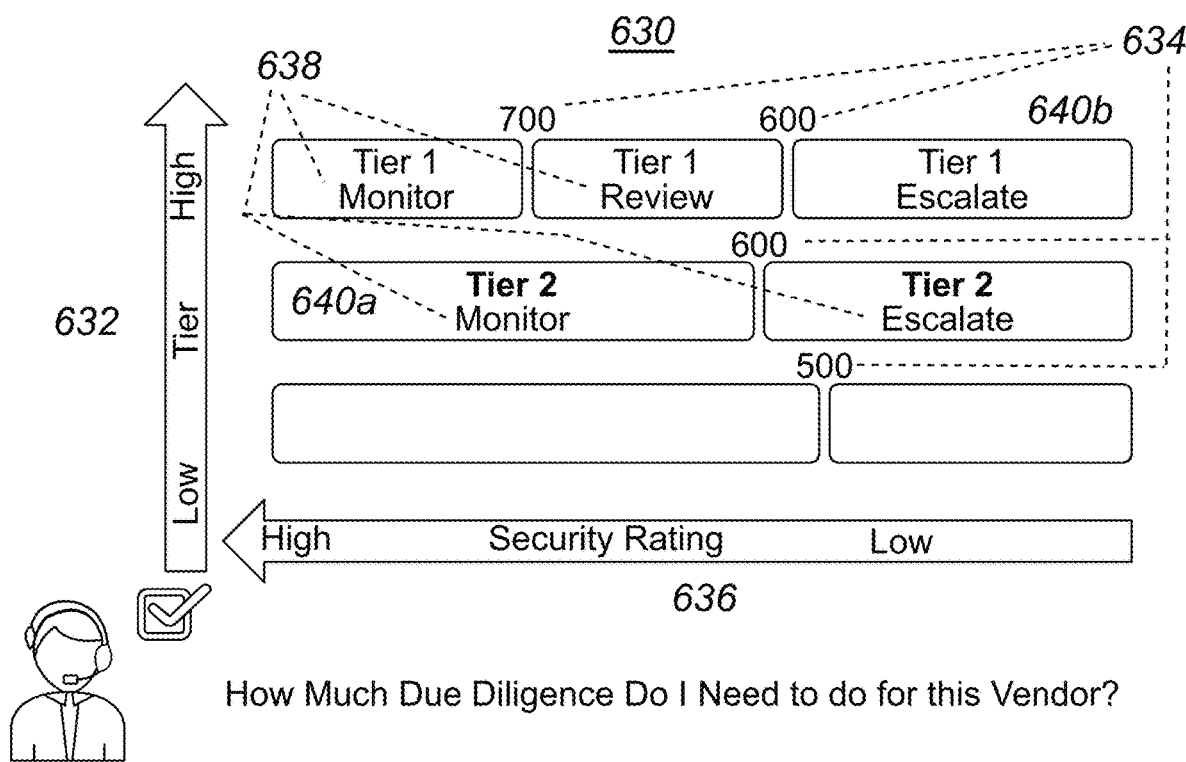
FIG. 6B depicts another example of a user interface for cybersecurity risk management, according to some embodiments.

Referring to FIGS. 6A-6C, some non-limiting embodiments of UI components (610, 630, 650) for cybersecurity risk management are illustrated. In particular, FIGS. 6A and 6B show two examples (610, 630) of a portfolio risk matrix UI component (or "portfolio risk matrix UI"). The portfolio risk matrix UI (610, 630) may provide a visual representation of a cybersecurity risk management workflow, including visual representations of criticality tiers (612, 632) configurable thresholds (614, 634) for security ratings (616, 636) (sometimes referred to herein as "risk thresholds" or "security rating thresholds"), and risk mitigation plans (618, 638) (e.g., "action plans"). The action plans may be assigned to affiliates based on the criticality tiers to which the affiliates are assigned, the affiliates' security ratings, and the risk thresholds.

In the examples of FIGS. 6A and 6B, the horizontal axis represents affiliates' security ratings, the vertical axis represents the criticality tiers to which affiliates are assigned, and the horizontal bars (620, 640) plotted in the two-dimensional area defined by the horizontal and vertical axes represent subsets of the affiliates of an entity E. In particular, each horizontal bar (620, 640) represents affiliates that (1) are assigned to the criticality tier corresponding to the bar's position on the vertical axis and (2) have security ratings within the range corresponding to the bar's position on the horizontal axis. As can be seen, the affiliates within each tier are partitioned into subsets based on the relationships between the affiliates' security ratings and the risk thresholds (614, 634). For example, in FIG. 6A, bar 620a represents affiliates that are assigned to Tier 1 and have security ratings greater than or equal to 700, and bar 620b represents affiliates that are assigned to Tier 2 and have security ratings less than 700. Likewise, in FIG. 6A, bar 640a represents affiliates that are assigned to Tier 2 and have security ratings greater than or equal to 600, and bar 640b represents affiliates that are assigned to Tier 1 and have security ratings less than 600.

In some embodiments, the portfolio risk matrix UI (610, 630) may include one or more interactive components, whereby a user may assign affiliates to tiers, adjust the risk thresholds within each tier, and/or assign specific action plans to subsets of the entity's affiliates that are defined by the affiliates' tier assignments, the affiliates' security ratings, and the risk thresholds. For example, in response to user selection of a portion of the portfolio risk matrix UI (e.g., the portion of the UI 610 that displays the text "N/M Companies Tiered"), the risk management tool 500 may recommend tier assignments for one or more affiliates of an entity E (e.g., by performing the risk management method 700), prompt the user to adopt or adjust recommended or actual tier assignments for one or more affiliates of the entity E, etc.

As another example, in response to user selection of another portion of the portfolio risk matrix UI, the risk management tool 500 may prompt the user to assign action plans to subsets of the entity's affiliates. For example, in response to user selection of a bar (620, 640) corresponding to a particular tier T and a particular range R of security ratings, the risk management tool 500 may prompt the user to assign an action plan to affiliates that are assigned to the tier T and have a security rating within the range R. Some non-limiting examples of suitable action plans for a subset of affiliates may include (1) continuing to monitor the affiliates, (2) reviewing the potential risks posed by the entity's relationships to the affiliates to determine whether further action is needed, and (3) escalating the entity's concerns about the affiliates' security status (e.g., by terminating or altering the entity's relationship with the affiliates, by contacting the affiliates to discuss their security status, etc.).

As yet another example, in response to user selection of another portion of the portfolio risk matrix UI, the risk management tool 500 may prompt the user to adjust the risk thresholds that partition the affiliates within a given tier into the subsets represented by bars (620, 640). For example, the risk management tool 500 may present such a prompt in response to selection of a tier label on the tier axis or selection of a risk threshold (614, 634). In some embodiments, risk thresholds within a tier T may be assigned and/or adjusted using the user interface 650 illustrated in FIG. 6C. (In some cases, the UI 650 may also be used to assign action plans to groups of affiliates that are assigned to the tier T and have a security rating within a range R defined by the risk threshold(s).

Any suitable number of risk thresholds may be assigned to each tier, and the risk thresholds within each tier may be independently configurable. In the example of FIG. 6B, two risk thresholds (600 and 700) are assigned to Tier 1, whereas a single risk threshold (600) is assigned to Tier 2, and a single risk threshold (500) is assigned to the third tier. One of ordinary skill in the art will appreciate that the risk thresholds may establish levels of risk within a tier, and that the action plans may connect an entity's high-level risk management strategy to the entity's individual affiliates based on the affiliates tiers and security ratings. In some embodiments, the risk management tool 500 may recommend or assign default values for the risk thresholds. Such default values may be determined based on beach statistics and/or any other suitable data.

An example has been described in which security ratings are plotted on a horizontal axis, tiers are plotted on a vertical axis, and horizontal bars represent groups of affiliates with tier assignments and security ratings corresponding to the bar's position in the portfolio matrix. Other configurations of the portfolio risk matrix are possible. For example, the security ratings may be plotted on the vertical axis, the tiers may be plotted on the horizontal axis, and vertical bars may be used to represent groups of affiliates with tier assignments and security ratings corresponding to the bar's position in the portfolio matrix. As another example, the directions of the individual axes may be reversed.

Figure 6D:
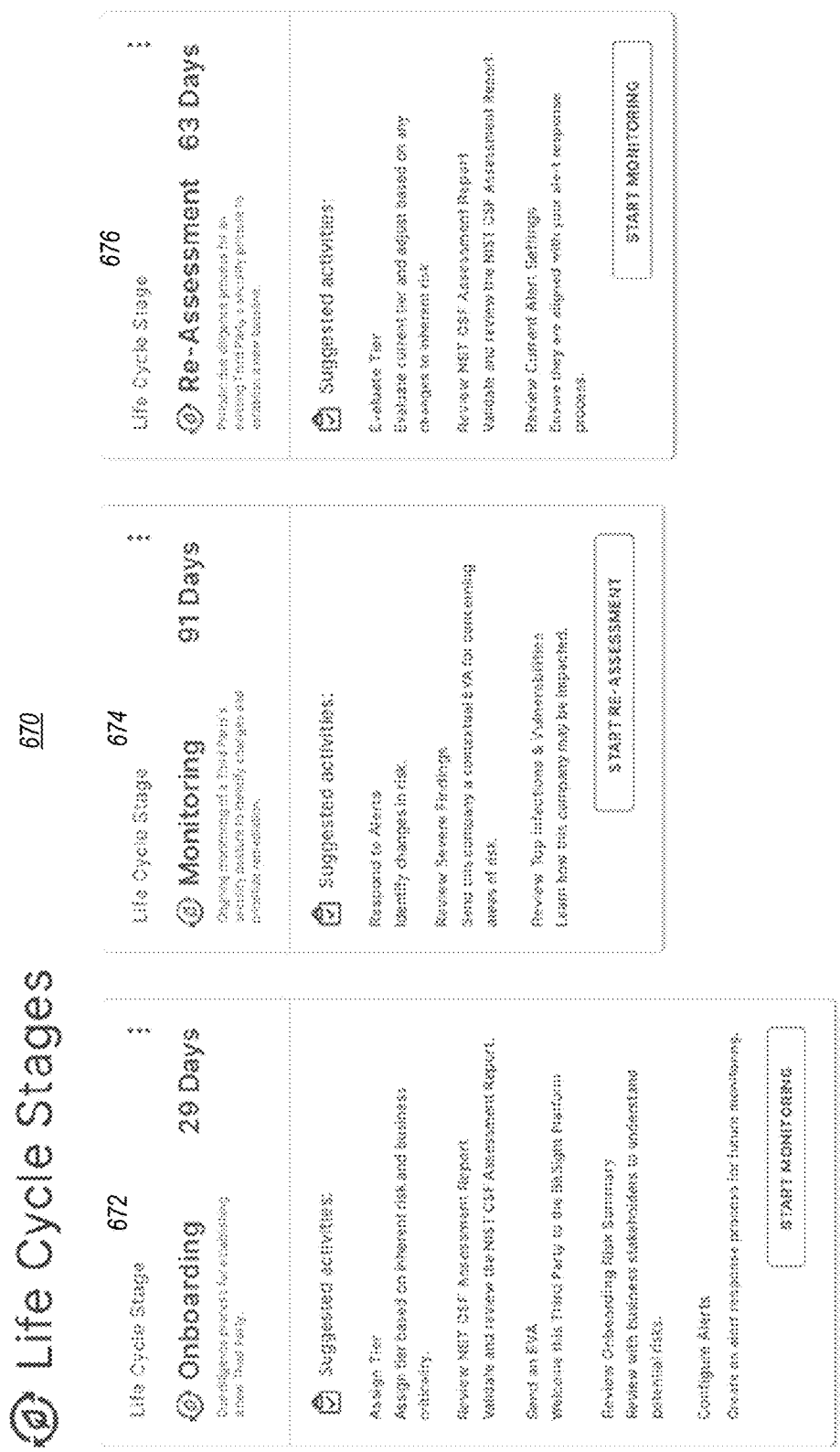
FIG. 6D depicts an example of yet another user interface for cybersecurity risk management, according to some embodiments.

Referring to FIG. 6D, an embodiment of another UI component 670 for cybersecurity risk management is shown. The UI component of FIG. 6D may be referred to herein as a "life cycle dashboard UI component" or simply "life cycle dashboard UI." The life cycle dashboard UI 670 may provide an interface to the risk management tool 500 organized around the life cycle stages of an entity E (e.g., onboarding, monitoring, and re-assessment).

During the onboarding stage, the life cycle dashboard UI 670 may prompt the user to perform one or more of the tasks shown in the onboarding panel 672 of the life cycle dashboard UI 670. For example, onboarding panel 672 may prompt the user to assign its affiliates to tiers. In response to selection of the tier assignment task by the user, the risk management tool 500 may, for example, recommend tier assignments for one or more of the entity's affiliates (e.g., by performing the risk management method 700).

During the monitoring stage, the life cycle dashboard UI 670 may prompt the user to perform one or more of the tasks shown in the monitoring panel 674 of the life cycle dashboard UI 670.

During the re-assessment stage, the life cycle dashboard UI 670 may prompt the user to perform one or more of the tasks shown in the re-assessment panel 676 of the life cycle dashboard UI 670. For example, re-assessment panel 676 may prompt the user to evaluate the tier assignments of its affiliates. In response to selection of the tier assignment task by the user, the risk management tool 500 may, for example, recommend tier assignments for one or more of the entity's affiliates (e.g., by performing the risk management method 700).

Figure 7:
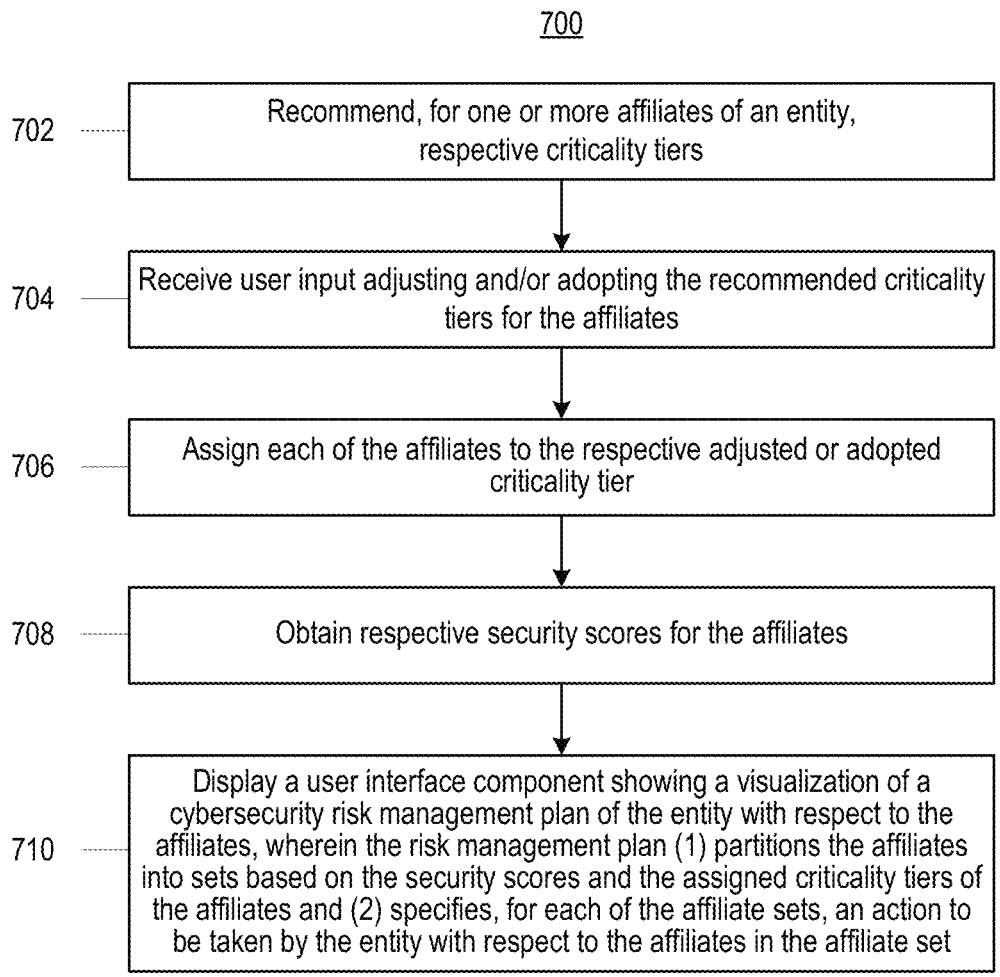
FIG. 7 depicts a flowchart another entity-specific cybersecurity risk management method, according to some embodiments.

FIG. 7 depicts an entity-specific cybersecurity risk management method 700, according to some embodiments. In the example of FIG. 7, the risk management method 700 includes steps 702-710, which are described below. In some embodiments, the risk management method 700 is performed, for example, by a risk management tool 500 (e.g., by an tier recommendation module 510 of the risk monitoring tool 500).

In step 702 of the method 700, the risk management tool 500 recommends, for each of a plurality of affiliates of an entity, a respective cybersecurity criticality tier. The criticality tier may be selected from a set of criticality tiers. Recommending criticality tiers for the plurality of affiliates may involve identifying the recommended criticality tiers for the affiliates, and presenting the recommended criticality tiers for the of affiliates via a user interface component. The recommended criticality tiers for the affiliates may be identified using a machine-learned model. The machine-learned model may be selected based on a peer group of the entity. The peer group of the entity may be identified based on one or more characteristics of the entity (e.g., the entity's size, an industry in which the entity operates, and/or a sector in which the entity operates). The machine-learned model may identify a particular recommended criticality tier for a particular affiliate based on (1) one or more characteristics of the particular affiliate and (2) an analysis of a plurality of tier assignments made by a plurality of peer entities included in the peer group, wherein each of the tier assignments is an assignment of an affiliate of at least one of the peer entities to a criticality tier. In some embodiments, the model's identification of a criticality tier for an affiliate may also be based on one or more characteristics of the entity (e.g., the size of the entity's portfolio of monitored affiliates). In some embodiments, the machine-learned model is a regression model (e.g., a linear regression model).

In some embodiments, a process for identifying the recommended criticality tiers for a plurality affiliates includes steps of (1) generating, using the machine-learned model, respective criticality scores for the plurality of affiliates; (2) normalizing the criticality scores, thereby generating normalized criticality scores within a bounded range; (3) partitioning the normalized criticality scores into a number of partitions equal to the number of criticality tiers, wherein each of the partitions corresponds to a respective one of the criticality tiers; and (4) for each affiliate, selecting the criticality tier corresponding to the partition to which the normalized criticality score of the affiliate is assigned, and identifying the selected criticality tier as the recommended criticality tier for the affiliate.

In step 704 of the method 700, the risk management tool 500 receives user input adjusting and/or adopting the recommended criticality tier for each of the affiliates. Such user input may be received, for example, via a component of a user interface 530.

In step 706 of the method 700, the risk management tool 500 assigns each of the affiliates to the respective criticality tier adjusted or adopted in step 704. The risk management tool 500 may make these assignments in response to user input received via a component of a user interface 530.

In step 708 of the method 700, the risk management tool 500 obtains respective security ratings for each of the affiliates. Some techniques for obtaining security ratings for entities (e.g., affiliates) are described above.

In step 710 of the method 700, the risk management tool 500 displays a user interface component configured to show a visualization of a cybersecurity risk management plan of the entity with respect to the plurality of affiliates. The visualization of the action plan may include a two-dimensional matrix, such that a first dimension of the matrix corresponds to a range of security ratings, and a second dimension of the matrix corresponds to a set of criticality tiers. The user interface component may be a portfolio risk matrix UI component (610, 630).

The risk management plan may partition the affiliates into a plurality of affiliate sets based on the security ratings and the assigned criticality tiers of the affiliates. The risk management plan may specify, for each of the affiliate sets, an action to be taken by the entity with respect to the affiliates in the affiliate set. The action to be taken by the entity with respect to the affiliates in a given set may include monitoring the affiliates, investigating the affiliates, and/or contacting the affiliates.

Machine Learning Techniques and Machine-Learned Models

"Machine learning" ("ML") generally refers to the application of certain techniques (e.g., pattern recognition and/or statistical inference techniques) by computer systems to perform specific tasks. Machine learning systems may build machine learned models based on sample data (e.g., "training data") and may validate the models using validation data (e.g., "testing data"). The sample and validation data may be organized as sets of records (e.g., "observations"), with each record indicating values for a set of fields. The model may be configured to infer the values of specified data fields (e.g., "dependent variables," "outputs," or "targets") based on the values of other data fields (e.g., "independent variables," "inputs," or "features"). When presented with other data (e.g., "inference data") similar to or related to the sample data, a machine learning system may use such a model to accurately infer the unknown values of the targets of the inference data set.

The process of using machine learning to build a model that accurately performs an inference task generally includes steps of data collection, data cleaning, feature engineering, model generation, and model deployment. "Automated machine learning" ("AutoML") techniques may be used to automate steps of the machine learning process or portions thereof.

As used herein, the phrase "machine learned model" may refer to any suitable model artifact generated by the process of applying a machine learning algorithm to specific training data. A machine learned model may be implemented, at least in part, by a computer system. For example, a machine learned model may be developed (e.g., trained and/or validated) and/or deployed (e.g., used) by a computer system. In some embodiments, a machine learned model can be a predictive model. Exemplary embodiments of a machine learned model can include a decision tree, a support vector machine model, a regression model, a boosted tree, a random forest, a neural network, a deep learning neural network, a k-nearest neighbor model, a naïve Bayes model, etc. Machine learned models may be implemented by computer systems because, in general, it would be too difficult or too inefficient for the models to be developed or deployed by a human, at least due to the size and/or complexity of an associated dataset (e.g., training data or inference data).

A machine learned model may be trained using any suitable machine learning algorithm and training data set. Some non-limiting examples of machine learning algorithms include linear regression, logistic regression, linear discriminant analysis ("LDA"), classification and regression trees, decision trees, random forests, naïve Bayes classification, K-nearest neighbors classification, learning vector quantization, support vector machine classification, deep learning, gradient boosting, generative adversarial networking learning, reinforcement learning, Bayesian optimization, matrix factorization, dimensionality reduction techniques (e.g., manifold learning, principal component analysis, factor analysis, autoencoder regularization, independent component analysis, etc.), and/or the like. In certain embodiments, an ensemble machine learning algorithm may comprise an ensemble or combination of various constituent machine learning algorithms. A machine learning algorithm for a particular training data set may be selected based on whether the training data set comprises continuous labels or classification labels, for example.

Some machine learning algorithms are "supervised." With supervised machine learning algorithms, the training data set includes reference labels that allow the machine learning algorithm to train a model from the data to perform inference tasks on an inference data set that does not include reference labels. For example, a training data set may include various data points for dogs such as weight, height, gender, breed, etc. A machine learning algorithm may train a model using the dog training data set so that the model can be used to infer various characteristics of a dog such as a dog's weight, gender, breed, and/or the like using an inference data set that does not include labels for the features that are being inferred.

Any suitable techniques (e.g., predictive modeling processes, machine learning processes, etc.) may be used to fit a model to training data and/or to tune (e.g., optimize) the model, including but not limited to cross-validation and hyper-parameter tuning.

A machine learned model may be validated using a validation data set. The validation data set, in one embodiment, comprises a data set that includes reference labels for various features so that when the machine learned model analyzes the validation data set, the predictions that the model generates can be compared against the reference labels in the validation data set to determine the accuracy of the predictions.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 8:
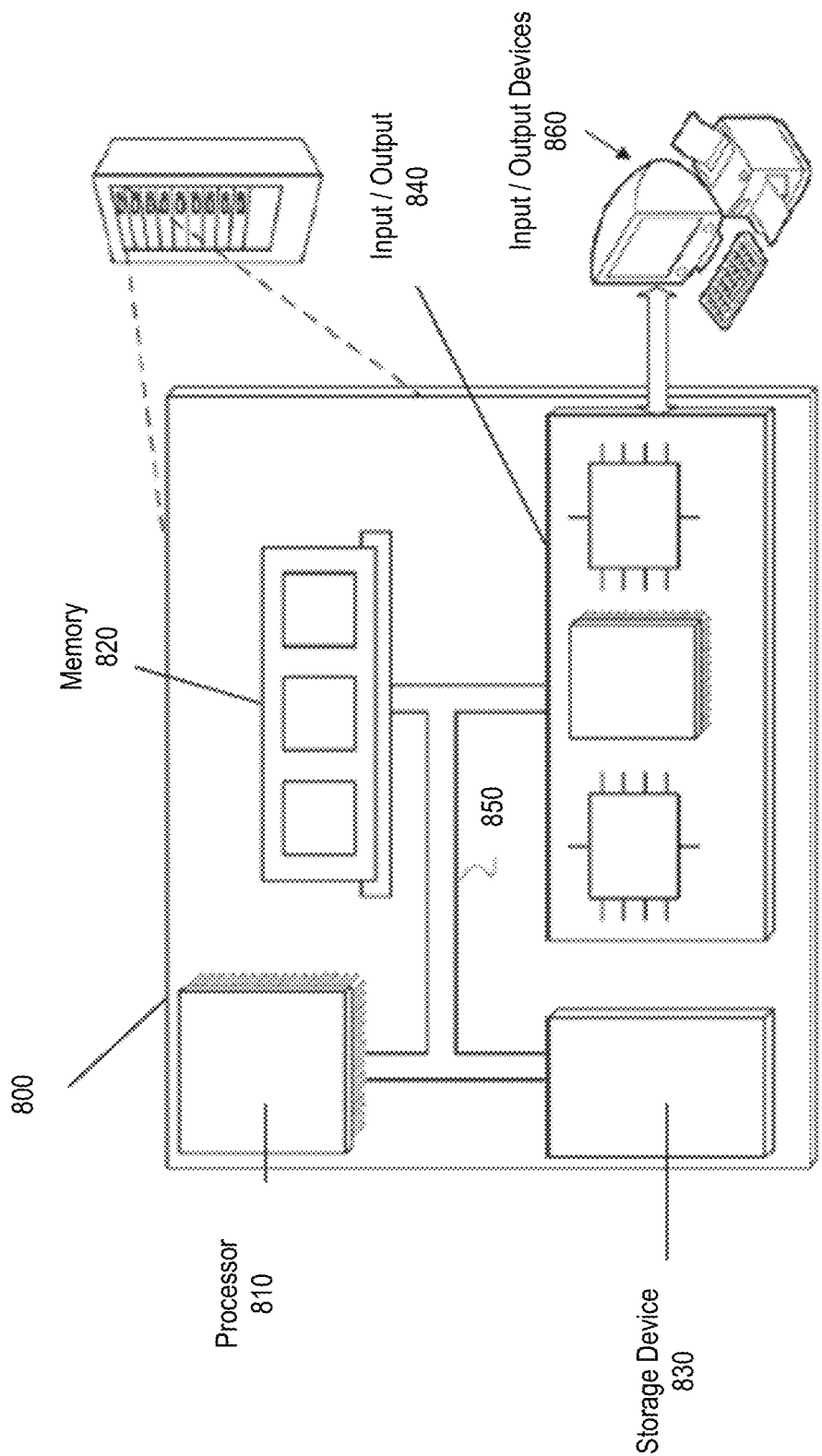
FIG. 8 is a diagram of an example computer system that may be used in implementing some embodiments of the systems and methods described herein.

FIG. 8 is a block diagram of an example computer system 800 that may be used in implementing the technology described in this document. General-purpose computers, network appliances, mobile devices, or other electronic systems may also include at least portions of the system 800. The system 800 includes a processor 810, a memory 820, a storage device 830, and an input/output device 840. Each of the components 810, 820, 830, and 840 may be interconnected, for example, using a system bus 850. The processor 810 is capable of processing instructions for execution within the system 800. In some implementations, the processor 810 is a single-threaded processor. In some implementations, the processor 810 is a multi-threaded processor. The processor 810 is capable of processing instructions stored in the memory 820 or on the storage device 830.

The memory 820 stores information within the system 800. In some implementations, the memory 820 is a non-transitory computer-readable medium. In some implementations, the memory 820 is a volatile memory unit. In some implementations, the memory 820 is a non-volatile memory unit.

The storage device 830 is capable of providing mass storage for the system 800. In some implementations, the storage device 830 is a non-transitory computer-readable medium. In various different implementations, the storage device 830 may include, for example, a hard disk device, an optical disk device, a solid-date drive, a flash drive, or some other large capacity storage device. For example, the storage device may store long-term data (e.g., database data, file system data, etc.). The input/output device 840 provides input/output operations for the system 800. In some implementations, the input/output device 840 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 860. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 830 may be implemented in a distributed way over a network, such as a server farm or a set of widely distributed servers, or may be implemented in a single computing device.

Although an example processing system has been described in FIG. 8, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, an engine, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A cybersecurity risk management method, comprising:
identifying a subset of a plurality of affiliates of an entity for cybersecurity monitoring, such that a collective cybersecurity threat posed by the subset of affiliates to the entity is indicative of a collective cybersecurity threat posed by the plurality of affiliates to the entity, the identifying including
  determining a target distribution of affiliates within a representative sample of the plurality of affiliates,
  recommending one or more adjustments to a current sample of the affiliates of the entity, the adjustments being applicable to the current sample to reduce a difference between an actual distribution of affiliates within the current sample and the target distribution of affiliates within the representative sample, and
  upon receipt of user input indicating acceptance of at least one of the recommended adjustments, making the at least one accepted adjustment to the current sample of the affiliates, thereby generating an adjusted sample of the affiliates, wherein the adjusted sample of the affiliates is the subset of affiliates for cybersecurity monitoring; and monitoring the subset of affiliates.

2. The method of claim 1, wherein determining the target distribution of affiliates within the representative sample comprises identifying a peer group of the entity based on one or more characteristics of the entity.

3. The method of claim 2, wherein the characteristics of the entity include a size of the entity, an industry in which the entity operates, and/or a sector in which the entity operates.

4. The method of claim 2, wherein the target distribution of affiliates within the representative sample comprises an aggregation of respective distributions of affiliates within samples of affiliates of a plurality of peer entities within the peer group.

5. The method of claim 4, wherein the aggregation of respective distributions of affiliates comprises an average of the respective distributions of affiliates.

6. The method of claim 1, wherein the affiliates within the representative sample are first affiliates, and wherein the target distribution of the first affiliates indicates, for each of a plurality of affiliate classifications, a proportion of the first affiliates having the respective classification.

7. The method of claim 1, wherein recommending the one or more adjustments to the current sample of the affiliates of the entity comprises comparing the actual distribution of affiliates within the current sample and the target distribution of affiliates within the representative sample.

8. The method of claim 7, wherein recommending the one or more adjustments to the current sample of the affiliates of the entity further comprises:

generating a plurality of potential adjustments to the current sample of affiliates; and assigning respective scores to the potential adjustments, each of the scores being indicative of an expected impact of the corresponding potential adjustment on the difference between the actual distribution of affiliates and the target distribution of affiliates.

9. The method of claim 8, wherein the scores assigned to the potential adjustments are determined based, at least in part, on criticality tiers to which the affiliates in the plurality of affiliates are assigned.

10. The method of claim 9, wherein the criticality tiers are assigned to the affiliates based, at least in part, on tier recommendations provided by a machine-learned model.

11. The method of claim 10, wherein the machine-learned model comprises one or more classifiers, wherein each of the classifiers is associated with a respective group of entities, and wherein each of the classifiers is configured to assign candidate affiliates of entities in the respective group to corresponding criticality tiers based on one or more attributes of the candidate affiliates.

12. The method of claim 8, wherein recommending the one or more adjustments to the current sample of the affiliates of the entity further comprises:

selecting one or more of the potential adjustments based on the scores; and presenting the selected potential adjustments via a user interface, wherein the selected potential adjustments are the one or more recommended adjustments.

13. The method of claim 1, wherein each affiliate in the adjusted sample of affiliates is assigned (1) a respective security score indicating a level of cybersecurity risk associated with the affiliate and (2) a respective criticality tier indicating a level of criticality of a relationship between the affiliate and the entity.

14. The method of claim 13, further comprising displaying a user interface component configured to show a visualization of a cybersecurity risk mitigation plan of the entity with respect to the adjusted sample of affiliates, wherein the risk mitigation plan (1) partitions the adjusted sample of affiliates into a plurality of affiliate sets based on the security scores and the criticality tiers of the affiliates in the adjusted sample and (2) specifies, for each of the affiliate sets, an action to be taken by the entity with respect to the affiliates in the affiliate set.

* * * * *